PHONOGRAPH PICKUP

Filed Feb. 17, 1951

INVENTOR
RENÉ SNEPVANGERS
BY
Pennie, Edmonds, Morton, Barrows and Taylor
ATTORNEYS United States Patent Office 2,703,343
Patented Mar. 1, 1955

2,703,343

PHONOGRAPH PICKUP

René Snepvangers, New York, N. Y., assignor to Columbia Broadcasting System, Inc., New York, N. Y., a corporation of New York Application February 17, 1951, Serial No. 211,536

12 Claims. (Cl. 179—100.41)

This invention relates to phonograph record pickups or transducers employed to transform the vibrations imposed by a phonograph record upon a stylus into electrical signals for subsequent amplification and the operation of a loud speaking telephone or similar device. The invention relates particularly to a mounting for the crystal and stylus holder in pickups of the piezoelectric type.

The invention provides a mounting for the stylus holder in such pickups having great compliance with respect to the pickup housing and tone arm for the small motions imposed by phonograph record grooves but sufficiently stiff as regards static stresses to keep the crystal and stylus generally in the correct position with respect to the remainder of the pickup.

In the piezoelectric type of pickup to which this invention relates the useful signal is developed by strains imposed upon a crystal gripped at or near one end in a box-like housing or casing. The strains are imposed upon the crystal by a stylus operating through a stylus holder which grips the crystal at its opposite end in a chuck or pair of jaws. The stylus holder includes the chuck, a generally horizontal shank affixed to the chuck, and a stylus holding tube into which a replaceable stylus may be inserted. The gripping of the crystal at or near its one end in the housing restrains the crystal from rotations about a torsional axis parallel to its principal faces and, usually, to its longest dimension, but is insufficient to prevent gross movements of the crystal in other directions with respect to the housing.

Moreover, the crystal and stylus holder are extremely light and to insure proper tracking of the stylus with the record a downward stress upon the stylus in excess of the weight of the crystal and stylus holder is often desired. Thus it may be necessary to permit a transfer of some part of the weight of the housing to the stylus.

For these reasons additional support to the crystal and stylus holder is provided by coupling the end of the shank remote from the crystal to the housing. This coupling however must afford sufficient compliance between the housing and the stylus to permit the stylus to follow the undulations of the record grooves without jumping from one groove to an adjacent groove.

Particularly with the long playing records recently developed which contain from two hundred to three hundred grooves per inch, the relatively stiff stylus mountings hitherto employed have proven unsatisfactory by reason of the small depth of the grooves. To permit the stylus to track with such shallow grooves an increased lateral compliance is required.

In the prior art constructions with which the inventor is familiar the coupling between the housing and the end of the shank remote from the crystal has been effected by solid bushings of rubber or a similar material, used to space this end of the shank from the housing or from some member integral therewith. The compliance of the stylus holder with respect to the housing has therefore depended upon the compressive compliance of a plastic material, and this has proven insufficient in practice. According to the present invention instead the end of the shank remote from the crystal is connected to the housing via a flexible coupling whose compliance is not dependent upon compressional strains. The coupling element of the invention takes the form of a flexible coupler, most conveniently a tube, which links the shank with the housing. The coupler extends substantially parallel to the length of the shank so that both small torsional and lateral motions may be executed by the end of the shank without encountering substantial resistive stresses from the coupler. At the same time through a tensile stress on the coupler, the stylus may be suitably weighted for proper tracking with the record, and its position of equilibrium may be controlled.

According to another feature of my invention the crystal is enveloped over a substantial fraction of the surface of each of its principal faces with a sheet or layer of a plastic material which serves to damp out unwanted peaks in the natural modes of oscillation of the crystal. This construction is advantageous both with respect to the frequency characteristic of the resultant product and with respect to ease of manufacture and assembly.

According to still another feature of my invention the crystal is gripped in the housing not at one of its ends but between the ends of its dimension to which the stylus holder shank is made parallel. This mounting for the crystal raises the frequency of the natural peak in the vibrations of the crystal. By supporting the crystal in this way this peak may be moved out beyond the range of frequencies reproduced by the usual phonograph amplifier.

The invention will now be further described with reference to the accompanying drawings in which Fig. 1 is a plan view of a piezoelectric pickup according to the invention, the protective top cover plate being removed;

Figure 1:
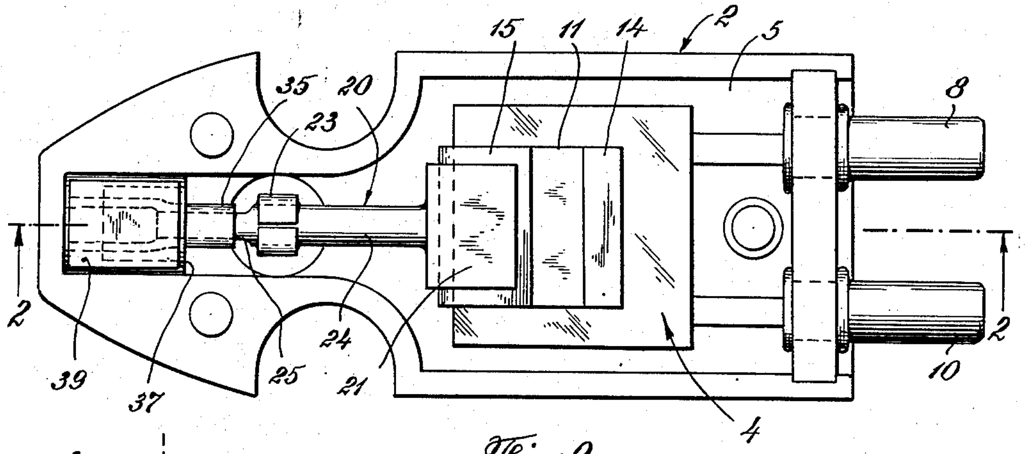

The pickup unit or cartridge illustrated in Fig. 1 includes a housing generally shown at 2 within which is supported a crystal 4. Electrodes, commonly in the form of metal coatings, are applied to the two opposite principal faces 6 and 7 (Fig. 2) of the crystal and connect with voltage terminals 8 and 10.

The crystal is enveloped over a portion of each of its principal faces by a sheet 11 of a plastic material such as rubber which serves to damp out unwanted peaks in the natural modes of oscillation of the crystal. In a preferred form of construction, as shown in the drawings, a single sheet is folded about one end of the crystal (that over which the chuck of the stylus holder is subsequently slipped) into contact with the two principal faces.

The crystal is supported within the housing by two assemblies 12 of blocks of plastic material, wedged between the crystal and the cover plates 3 and 5 of the housing. In the embodiment shown, the assemblies bear not on the crystal itself or its electrodes but on the sheet 11 applied to its principal faces. They may in fact be affixed to the sheet by means of an adhesive in a preliminary manufacturing operation before being applied with the sheet to the crystal. The support of the crystal within the housing however may be provided by means of frictional contact alone between the blocks of the assembly and the cover plates.

Each assembly may comprise one block only, but in the preferred embodiment shown in the drawings each comprises two blocks 13 and 14 of different materials having elastic and vibration dissipative properties suitably chosen in view of the frequency characteristic desired for the pickup.

The blocks are of very short extension in the direction of the length of the stylus holder 20 yet to be described, and conversely extend across a substantial fraction of the width of the crystal perpendicular to the stylus holder.

One of the blocks of each assembly may be made of a relatively soft rubber while the other may be made of a compound of rubber and asphalt or similar material whose presence accentuates the high frequency components of the crystal vibrations, possibly by promoting passage of the lower frequency components to the housing so that they are less effective in straining the crystal.

The relative thickness of the rubber and asphalt fractions of the assemblies may of course be varied to suit the requirements of reproduction.

Vibrations corresponding to the sounds to be reproduced are imposed upon the crystal at the end remote from the supporting assemblies 12 by means of a stylus generally indicated at 26, acting through a stylus holder generally indicated at 20. The stylus holder includes a stylus holding tube 23, a shank 24 and a crystal gripping yoke or chuck 21. The shank 24 is oriented parallel to the principal faces 6 and 7 of the crystal and perpendicular to the length of the blocks 13 and 14. The chuck grips the end of the crystal remote from the assemblies 12 through additional pads 15 of plastic material and through the sheet 11, which is wrapped about the chuck end of the crystal.

Figures 2, 3:
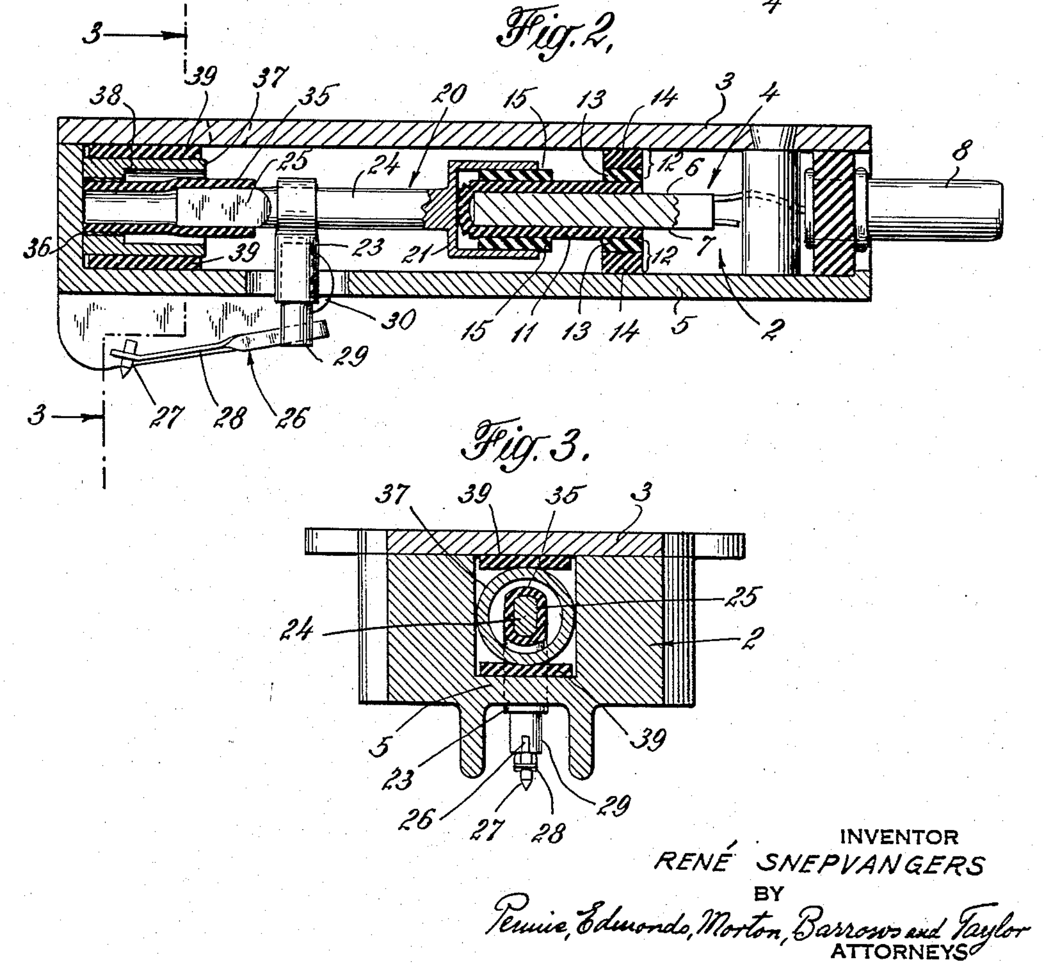
Fig. 2 is a sectional view in elevation taken on the line 2—2 of Fig. 1.
Fig. 3 is a sectional view taken on the line 3—3 of Fig. 2.

Fig. 2 shows at 26 a preferred form of stylus for use with the pickup of my invention. The stylus 26 includes a tip 27 of hard material such as sapphire affixed to an arm 28 which in turn is affixed to a stem 29 insertable into the stylus holding tube 23. A slot provided in the tube 23 accommodates a key 30 on the stem to prevent rotation of the stylus about a vertical axis. The lateral motions imparted to the tip 27 by the record grooves are thus transformed into lateral and rotational motion of the shank 24 with respect to the housing and with consequent strain of the crystal.

In a preferred embodiment the assemblies 12 engage the crystal about two-thirds of the distance from the end engaged by the chuck to the end opposite the chuck. For a flat rectangular crystal of the type shown, gripped with blocks of the type shown in the assemblies 12 and by means of a chuck at one end, this arrangement raises the natural peak in the vibrations of the crystal to a higher frequency than that which would obtain if the assemblies 12 gripped the crystal at the end opposite the chuck. This permits moving the natural peak of the crystal out beyond the desired range of frequencies useful for reproduction, with improvement in fidelity of reproduction and reduction of surface noise.

The front end of the shank 24, i. e. that remote from the chuck 21, is joined to the housing by means of a flexible coupler. The coupler or sleeve 35 slips snugly over the front end of the shank 24 and is made fast to the housing at a position substantially in line with the length of the shank 24. The sleeve 35 is preferably made of a short section of resilient tubular material such as vinylite.

The sleeve 35 reduces only very slightly the compliance of the stylus holder and crystal to the stresses imposed upon them by the stylus in following the record grooves. However it sustains them in a proper static position and pemits weighting of the stylus by a desired fraction of the weight of the housing and tone arm.

In a preferred embodiment the sleeve 35 is coaxially positioned in and affixed to the base of a cylindrical bushing or guard 37 supported in the housing in telescoping relation to the shank 24, in order to limit its motion in response to heavy blows on the stylus such as those caused by dropping the tone arm. The bushing is held between the walls of the casing in fixed position, as by means of spacers 39. While the internal diameter of the bushing is larger than the diameter of the shank and of the sleeve 35 slipped thereover, it includes at its base, remote from the crystal, a portion 38 of reduced size adapted to fit the sleeve 35, which may be held there by means of an adhesive 36.

By means of bushing 37 the lateral displacements of the front end of the shank are limited to excursions which are ample for the reproduction of sound but which are small enough to prevent damage to the crystal and its mounting elements within the cartridge.

The shank 24 may be of generally cylindrical or square section, but I have found it advantageous to reduce its thickness in the plane of Fig. 1 at the front end as indicated at the flattened portions 25 in Fig. 2. The aspect of the front end of the shank is further shown in Fig. 3 where the shank is seen to have at its end remote from the chuck a greater cross sectional dimension in directions perpendicular to the principal faces of the crystal than in directions parallel thereto. The flattened portions may conveniently extend from the end of the shank to the point of attachment of the stylus holding tube. The free end of the flexible sleeve 35 in slipping over the end of the shank assumes this flattened shape, with a consequent increase in the horizontal compliance of the stylus with respect to the housing over the value which would obtain with a cylindrical shape for the end of the shank. Conversely the vertical compliance is slightly reduced. This configuration of the shank promotes the reproduction of sound due to lateral undulations of the record grooves while discriminating against noise components introduced by irregularities in the depth of the grooves.

While I have described herein a preferred embodiment of my invention which has been successfully used, the invention itself is not restricted to the details of construction of the embodiment shown in the drawings and which has been described herein. For example, among others, the form of the chuck and the means for affixing the stylus holder to the crystal and the means for supporting the stylus on the stylus holder are susceptible of changes within the scope of the invention, which is set forth in the appended claims.

I claim:

1. A phonograph record pickup of the piezoelectric type comprising a housing, a piezoelectric crystal, means to support the crystal adjacent one end thereof within the housing against stresses applied to the opposite end of the crystal, a unitary stylus holder including a shank carrying a yoke at one end adapted to grip the crystal, and a flexible coupler secured at one end to the housing and at its opposite end to the end of the shank remote from the crystal, the coupler having an unsupported portion extending between the ends thereof substantially axially of the shank, said axial portion and said opposite end of the coupler being capable of lateral displacement relative to said one end thereof.

2. A phonograph record pickup of the piezoelectric type comprising a housing, a piezoelectric crystal, means to support the crystal adjacent one end thereof within the housing against stresses applied to the opposite end of the crystal, a unitary stylus holder including a shank having one end affixed to the said opposite end of the crystal, and a flexible coupler secured at one end to the housing and at its opposite end to the end of the shank remote from the crystal, the coupler having an unsupported portion extending between the ends thereof substantially axially of the shank, said axial portion and said opposite end of the coupler being capable of lateral displacement relative to said one end thereof.

3. A phonograph record pickup of the piezoelectric type comprising a housing for the support of a crystal and stylus, a crystal supported adjacent one end within the housing against rotation about an axis through the crystal substantially parallel to the long dimension of the housing, a stylus holder including a substantially straight shank and a stylus holding tube depending from the shank for vibration in a plane perpendicular to the length of the shank, means to couple one end of the shank to the end of the crystal remote from its support for transmission to the crystal of motions imposed upon the shank by vibrations of the stylus holding tube, a cylindrical guard arranged in the housing in telescoping relation with the end of the shank remote from the crystal, and a coupler of compliant material of smaller external diameter than the internal diameter of the guard affixed to the housing concentrically with the guard and to the end of the shank remote from the crystal.

4. A phonograph record pickup of the piezoelectric type comprising a housing for the support of a crystal and stylus, a crystal supported at one end within the housing against rotation about an axis through the crystal substantially parallel to the long dimension of the housing, a stylus holder including a substantially straight shank and a stylus holding tube depending from the shank for vibration in a plane perpendicular to the shank, means to couple the shank to the end of the crystal remote from its support for transmission to the crystal of motions imposed upon the shank by vibrations of the stylus holding tube, a cylindrical stop affixed to the housing in telescoping relation with the end of the shank remote from the crystal, and a coupling member of compliant material of smaller diameter than the internal diameter of the stop linking the said end of the shank with the end of the cylinder remote from the crystal.

5. A piezoelectric pickup comprising a housing, a crystal arranged within the housing, means to fix one end of the crystal with respect to the housing, a stylus holder including a shank having one end affixed to the opposite end of the crystal, and a flexible coupler secured at one end to the housing and at its opposite end to the end of the shank remote from the crystal, the coupler having an unsupported portion extending between the ends thereof substantially axially of the shank, said axial portion and said opposite end of the coupler being capable of lateral displacement relative to said one end thereof.

6. A piezoelectric pickup comprising a housing having upper and lower cover plates, a crystal arranged within the housing, a layer of plastic material covering a portion of each of the principal faces of the crystal, a block of plastic material wedged on either side of the crystal between one of the cover plates and a layer of said plastic material, said blocks being spaced along said principal faces substantially one-third of the distance from one end of the crystal, a chuck gripping the end of the crystal remote from the blocks between layers of said plastic material, a shank affixed to the chuck extending substantially parallel with the principal faces of the crystal, a stylus holding means affixed to the shank intermediate the ends thereof, a flexible coupler affixed to the end of the shank remote from the stylus and to the housing, and a cylindrical guard of greater internal diameter than the shank arranged within the housing in telescoping relation with the end of the shank remote from the housing.

7. A piezoelectric pickup comprising a housing having upper and lower cover plates, a crystal arranged within the housing, a sheet of plastic material wrapped about one end of the crystal into contact with its two principal faces, one or more blocks of plastic material wedged on either side of the crystal between one of the cover plates and the said sheet, a chuck gripping the said end of the crystal between layers of the said sheet, a shank affixed to the chuck extending substantially parallel with the principal faces of the crystal, means to support a stylus affixed to the shank intermediate its ends, a cylindrical bushing of larger internal diameter than the shank supported within the housing coaxially with and in telescoping relation to the end of the shank remote from the clutch, and a flexible coupler affixed at one end to the shank and at the other end to the base of the bushing concentrically therewith, said coupler having a smaller external diameter than the internal diameter of said bushing.

8. A piezoelectric pickup comprising a housing having upper and lower cover plates, a crystal arranged within the housing, a sheet of plastic material wrapped about one end of the crystal into contact with its two principal faces, two blocks of plastic material wedged on either side of the crystal between one of the cover plates and the said sheet, a chuck gripping the said end of the crystal between layers of the said sheet, a shank affixed to the chuck extending substantially parallel with the principal faces of the crystal, means to support a stylus affixed to the shank intermediate its ends, a cylindrical bushing of larger internal diameter than the shank supported within the housing in telescoping relation with the end of the shank remote from the clutch, and a flexible coupler affixed at one end to the shank and at the other end to the bushing concentrically therewith at the end of the bushing remote from the crystal, said coupler having a smaller external diameter than the internal diameter of said bushing.

9. In a phonograph pickup of the piezoelectric type, a housing, a crystal supported adjacent one end within the housing against rotations about an axis parallel to its principal faces, a stylus holder including a shank having one end affixed to the crystal, and a flexible coupler secured at one end to the housing and at its opposite end to the other end of the shank remote from the crystal, the coupler having an unsupported portion extending between the ends thereof substantially axially of the shank, said axial portion and said opposite end of the coupler being capable of lateral displacement relative to said one end thereof.

10. In a phonograph pickup of the piezoelectric type, a housing, a crystal supported adjacent one end within the housing against rotations about an axis parallel to its principal faces, a stylus holder affixed at one end to the crystal, said holder including a shank extending substantially parallel to the principal faces of the crystal, a flexible coupler secured at one end to the housing and at its opposite end to the other end of the holder remote from the crystal, the coupler having an unsupported portion extending between the ends thereof substantially axially of the holder, said axial portion and said opposite end of the coupler being capable of lateral displacement relative to said one end thereof, and a cylindrical stop within the housing surrounding the end of the stylus holder remote from the crystal, the internal diameter of said stop being larger than the external diameter of said coupler.

11. A phonograph pickup of the piezoelectric type comprising a housing, a crystal supported within the housing adjacent one end of said crystal, a stylus holder affixed to the opposite end of the crystal and extending therefrom substantially parallel to the principal faces of the crystal, the end of the stylus holder remote from the crystal having a cross section of smaller dimensions in planes parallel to the principal faces of the crystal than in planes perpendicular thereto, a flexible tube fitting snugly at one end over the said end of the stylus holder and affixed at its other end to the housing to extend substantially parallel to the stylus holder, and a cylindrical bushing in the housing surrounding the said end of the holder in telescoping relation.

12. A phonograph pickup of the piezoelectric type comprising a housing, a crystal supported within the housing, a stylus holder affixed to the crystal and extending therefrom substantially parallel to the principal faces of the crystal, the end of the stylus holder remote from the crystal having a cross section of smaller dimensions in planes parallel to the principal faces of the crystal than in planes perpendicular thereto, and a flexible tube fitting snugly at one end over the said end of the stylus holder and affixed at its other end to the housing to extend substantially parallel to the stylus holder.

References Cited in the file of this patent

UNITED STATES PATENTS

| | | |
|---|---|---|
| 2,261,616 | Dally | Nov. 4, 1941 |
| 2,381,861 | Bauer | Aug. 14, 1945 |
| 2,480,907 | Dally | Sept. 6, 1949 |
| 2,495,146 | Straughn | Jan. 17, 1950 |
| 2,498,210 | Kilgour | Feb. 21, 1950 |
| 2,513,269 | Bauer | July 4, 1950 |